G. B. FERGUSON.

HINGED SHINGLE STRIP.

APPLICATION FILED JULY 7, 1922.

Reissued Aug. 29, 1922. 15,439.

INVENTOR:
George B. Ferguson
BY Robt. P. Haines
ATTORNEY

UNITED STATES PATENT OFFICE.

GEORGE B. FERGUSON, OF NEW BEDFORD, MASSACHUSETTS.

HINGED-SHINGLE STRIP.

15,439. Specification of Reissued Letters Patent. Reissued Aug. 29, 1922.

Original No. 1,410,903, dated March 28, 1922, Serial No. 472,714, filed May 26, 1921. Application for reissue filed July 7, 1922. Serial No. 573,486.

*To all whom it may concern:*

Be it known that I, GEORGE B. FERGUSON, a citizen of the United States, residing at New Bedford, in the county of Bristol and State of Massachusetts, have invented certain new and useful Improvements in Hinged-Shingle Strips, of which the following is a specification.

This invention relates to certain new and useful improvements in folding shingles and pertains more especially to shingles made in long integral strips.

Heretofore shingles have been made of integral strip formation usually formed to represent or impart the appearance, when properly laid of four distinct shingles. This prior construction has been formed by covering one side of a flexible back with heated asphalt and applying finely crushed slate thereto and rolling same into the asphalt while the latter is still hot, resulting in a comparatively stiff structure. These prior strips cannot be folded without breakage and consequently cannot be made long owing to the length of the resultant packages in shipping and the awkward handling of the strips when laying same on a roof.

The primary object of the invention, is to therefore provide a shingle which can be made in long lengths and which can be folded without possible cracking or breaking of the slate covering, thereby enabling the shingles to be made into compact and easily handled and transported packages and to also enable the same to be more easily handled in carrying the shingles up onto the roof and in laying same, and to also increase the speed of laying by providing long strips which accordingly require the fitting of a less number of joints between the strip ends.

Figure 1:
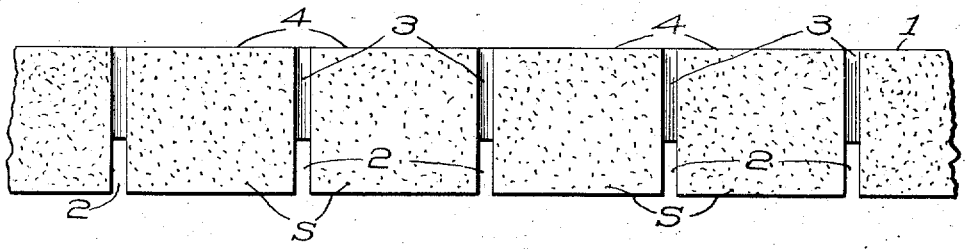
Fig. 1 is a fragmentary plan view of a strip of shingles constructed in accordance with the present invention.
Figure 2:
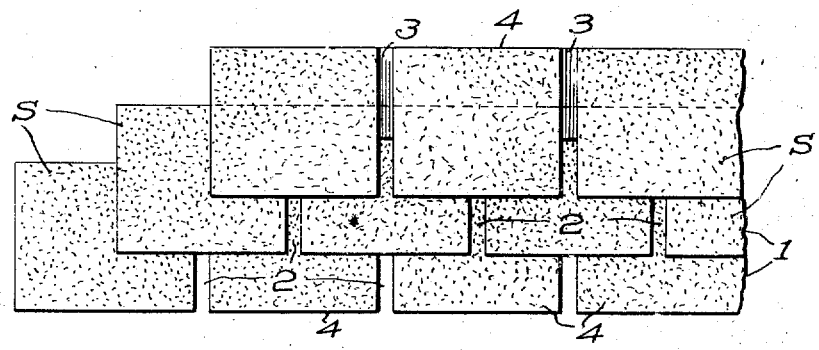
Fig. 2, is a similar view of the shingles in laid formation.
Figure 3:
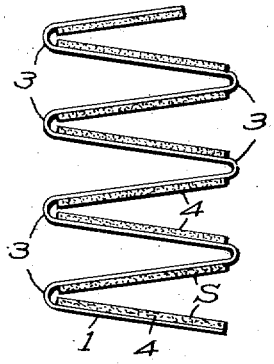
Fig. 3, is an edge view of a shingle strip showing the manner of folding.
Figure 4:
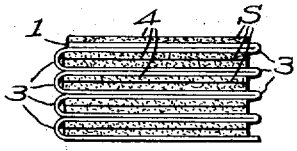
Fig. 4, is a view of a folded strip in package form.

In proceeding in accordance with the present invention, the strip 1 is made of lengths approximating twenty feet or more as desired and formed with the slots or cutouts 2 which give the appearance of individual shingles. Hot asphalt is applied to one side of the strip except at the areas 3, which latter are alined with and are substantially of the same widths as the cuts 2 and extend from the inner ends of the latter to the rear side edge of the strip. The crushed slate S is now rolled or applied under pressure to the asphalt coating and the areas 3 will consequently be free of the slate and will not be stiffened by the application of the coating as the remainder of the strip obviously is stiffened. These uncoated areas are consequently possessed of the original flexibility that the strip itself possesses and provide hinge connections about which the individual shingles 4 resultant from the cuts 2 may fold in ziz-zag formation as shown in Fig. 3 and be closely superimposed into the compact package of Fig. 4, in which it will be noted that the hinging parts 3 extend outwardly from and protect the end edges of the slate covering.

It will now be seen that the strips when folded can be more easily handled and lifted onto the roof and easily shifted about on the roof preparatory to laying the shingles. Further the packages can be more easily shipped or transported from one place or city to another, and the laying expedited owing to the length of the strips which require less joints. Heretofore, the shingles have been made in lengths of about four feet to allow of shipping, which must be in a flat state and also to allow of handling in raising same to the roof and while on the roof in laying. With the present invention, the strips can be made in lengths of twenty feet or more as desired, the time saving both as to packing, shipping, handling and laying on the roof, being thus apparent.

What is claimed is:

1. A folding shingle strip composed of a long integral strip having spaced slots extending inwardly from one side edge thereof and spaced at their inner ends from the opposite side edge of the strip and a coating of asphalt and crushed slate applied to one side of the strip and terminating at points alined with the slots and between the inner ends of the latter and said opposite side edge of the strip whereby to provide uncoated hinging parts about which the strip may be folded to cause the shingles to be superimposed upon each other.

2. A folding shingle strip composed of a long integral strip having slots to form individual though interconnected shingles and a covering applied to the strip to leave a series of uncoated areas on the strip alined with the cuts to provide hinging parts in conjunction with the slots about which the strip may be folded.

3. A folding shingle strip embodying a one-piece strip having spaced slots extending inwardly from one side edge thereof and spaced at their inner ends from the opposite side edge of the strip, and a covering applied to one face of the strip to leave a series of uncoated areas alined with the slots and extending from the inner ends of the latter through the opposite sides of the strip to afford hinging parts in conjunction with the slots about which parts and slots the strip may be folded.

4. A folding shingle strip composed of a long integral strip having slots to form individual though interconnected shingles and a covering applied to the strip to leave a series of uncoated areas on the strip alined with the slots to provide hinging parts in conjunction with the slots about which the strip may be folded, said uncoated areas being of a width so that the same will extend beyond the end edges of the coating to protect the latter when the strip is folded.

5. A folding shingle strip composed of an integral strip having a slot to form individual though interconnected shingles and a covering applied to the strip to leave an uncoated area on the strip alined with the slot to provide a hinging part in conjunction with the slot about which the strip may be folded.

6. A hinged shingle strip comprising a plurality of individual shingles arranged side by side with their longitudinal edges in spaced relation and having a flexible hinge crossing the space between said spaced longitudinal edges to connect the shingles so that they may be folded one upon the other, and having the hinge extending a substantial distance lengthwise of the space between the longitudinal edges but terminating short of one end of the shingles to provide an open space between the shingles that extends inwardly from one end thereof.

7. A hinged shingle strip comprising individual shingles arranged side by side with their longitudinal edges in spaced relation and having flexible hinges crossing the spaces between the longitudinal edges of the shingles to connect the shingles so that they may be folded alternately face to face and back to back, and having the hinges extending a substantial distance lengthwise of the space between said longitudinal edges but terminating short of one end of the shingles to prove open spaces between the adjacent shingles alined with the hinges.

In testimony whereof, I affix my signature to this specification.

GEORGE B. FERGUSON.